United States Patent [19]

Kurosawa et al.

[11] Patent Number: 5,191,569
[45] Date of Patent: Mar. 2, 1993

[54] DISK PLAYBACK DEVICE

[75] Inventors: Atsushi Kurosawa; Toshiyuki Kimoto; Sei Onishi; Kiyohito Kajihara, all of Saitama, Japan

[73] Assignee: Pioneer Electronic Corporation, Tokyo, Japan

[21] Appl. No.: 492,040

[22] Filed: Mar. 12, 1990

[30] Foreign Application Priority Data

| May 15, 1989 | [JP] | Japan | 1-21165 |
| May 22, 1989 | [JP] | Japan | 1-128546 |
| May 24, 1989 | [JP] | Japan | 1-131116 |
| May 30, 1989 | [JP] | Japan | 1-137209 |
| Jun. 9, 1989 | [JP] | Japan | 1-147667 |

[51] Int. Cl.$^5$ .......................................... G11B 17/04
[52] U.S. Cl. ............................ 369/38; 369/75.2; 369/187; 369/188
[58] Field of Search .............. 369/34, 36, 38, 176, 369/178, 181, 187, 188, 190, 206, 217, 238, 270, 271, 75.1, 75.2, 77.1, 77.2, 33

[56] References Cited

U.S. PATENT DOCUMENTS

| 4,589,101 | 5/1986 | Schatteman et al. ........... 369/36 |
| 4,796,244 | 1/1989 | Tsunura et al. ............... 369/38 |
| 4,800,554 | 1/1989 | Yamasaki et al. ............. 369/36 |
| 4,829,501 | 5/1989 | Seto et al. .................. 369/75.2 |
| 4,833,666 | 5/1989 | Gijzen et al. ................ 369/75.2 |
| 4,841,499 | 6/1989 | Takahashi et al. ............ 369/38 |
| 4,841,517 | 6/1989 | Kurihara et al. ............. 369/270 |
| 4,855,979 | 8/1989 | Kimura et al. ............... 369/38 |
| 4,879,615 | 11/1989 | Teranishi et al. ............ 369/34 |
| 4,914,647 | 4/1990 | Ono et al. .................. 369/270 |

FOREIGN PATENT DOCUMENTS

| WO8501607 | 4/1985 | European Pat. Off. . |
| 0173136 | 5/1986 | European Pat. Off. . |
| 0217393 | 10/1986 | European Pat. Off. . |
| WO8700673 | 1/1987 | European Pat. Off. . |
| 0240926 | 4/1987 | European Pat. Off. . |
| 0265269 | 10/1987 | European Pat. Off. . |
| 0277634 | 2/1988 | European Pat. Off. . |
| 0265269A | 4/1988 | European Pat. Off. . |
| 0284445 | 9/1988 | European Pat. Off. . |
| 3607586 | 7/1986 | Fed. Rep. of Germany . |
| 3914128 | 4/1989 | Fed. Rep. of Germany . |
| WO8000508 | 3/1980 | France . |
| 981067 | 5/1961 | United Kingdom . |
| 2148579A | 5/1985 | United Kingdom . |
| 2221340A | 1/1990 | United Kingdom . |
| 9005624.3 | 7/1990 | United Kingdom . |
| 2218254A | 11/1990 | United Kingdom . |

Primary Examiner—Eugene R. LaRoche
Assistant Examiner—Tan Nguyen
Attorney, Agent, or Firm—Sughrue, Mion, Zinn, Macpeak & Seas

[57] ABSTRACT

A disk playback device includes a magazine for several disks and trays for supporting the disks, a magazine housing for the magazine, a disk playback section for playing back data recorded on a disk and a tray transport section for transporting a tray, supporting a selected disk, between the magazine and the playback section. In one embodiment, the playback device includes a disk guide for securely placing a played back disk onto its associated tray. In another embodiment, the playback device includes a disk guide for guiding disks of various diameters. In another embodiment, the playback device includes an optical detecting element for detecting whether a tray contains a disk. In another embodiment, the playback device includes a switch for detecting whether a magazine has been inserted and locked in the magazine housing. In another embodiment, the playback device includes a guide mechanism for securely guiding a disk clamper to a selected disk for playback.

19 Claims, 13 Drawing Sheets

DISK PLAYBACK DEVICE

FIELD OF THE INVENTION

The present invention relates to a disk playback device of the type in which a magazine containing a plurality of disks is housed in a magazine housing, and data is played back from a selected disk by transporting the selected disk from the magazine to a playback section.

BACKGROUND OF THE INVENTION

Recently there has been employed a disk playback device of the type which includes a magazine containing several compact disks arranged in a stacked manner, a tray for supporting and transporting the disks from the magazine to a playback section of the device so that data, recorded on the disk, can be played back.

As shown in FIGS. 1 and 2, this type of disk playback device 170 is provided with a magazine housing 171 and a data playback section 172 adjacent to the magazine housing 171. The magazine housing 171 houses a magazine M containing a plurality of compact disks arranged in a stacked manner. The data playback section 172 plays back data from a compact disk "d" which is set in a tray "t" and which is fed out of the magazine M. A tray turning member 173 is located on the left side (as viewed in FIG. 1) of the boundary between the magazine housing 171 and the data playback section 172. The tray turning member 173 turns the tray "t" stored in the magazine M to transport the compact disk "d" to the data playback section, and also serves to return the tray "t" back to the magazine M. The tray turning member 173 consists of two arms extending in directions which are orthogonal to each other. Those arms are located at a corner of the magazine M, and face the two sides of the magazine which are orthogonal to each other. The tray turning member 173 is turned by means of a known tray turning mechanism 174 which is installed on the left side (as viewed in FIG. 1) of the data playback section 172.

The tray turning member 173 may be turned within a range of 90 degrees. The arm 173a of the member 173 faces the side wall "to" of the tray projected from a narrow opening as shown in FIG. 2. To feed a tray "t" holding a desired compact disk "d" and to set it at a predetermined position (clamping position) in the data playback section 172, the magazine M is vertically moved by a mechanism (not shown), to face the side wall "to" of the tray "t", and the tray turning member 173 is turned counterclockwise, to turn the tray "t" about a pin 180 provided at a corner of the magazine M, by 90 degrees. To return the tray "t" back to the magazine M, the tray turning member 173 is turned clockwise.

A disk receiving depression 181 is formed in the center portion of the tray "t". The depression 181 has a diameter which is large enough to accept a compact disk having a 12 cm diameter. However, recently, a small compact disk (8 cm in diameter) has been used. As shown in FIG. 3, to set this small compact disk in the depression, a spacer ring S is set in the depression 181 and the small compact disk "d1" is placed within the spacer S.

After the tray "t" is set at the predetermined location in the data playback section 172, the disk "d" (FIG. 2) or "d1" (FIG. 3), is clamped by a support wheel 191 of a spindle motor 190 disposed above the disk and a clamper 192 disposed below the disk. The disk "d" or "d1" is turned by a spindle motor 190. Data is played back from the compact disk by means of a pick-up (not shown). To clamp the disk, the clamper 192 is lifted through an opening O of the tray "t" and cooperates with the support wheel 191 to clamp the disk on the tray "t".

As indicated above, the magazine M is set in the magazine housing 171 of the disk playback device 170. A check is made as to whether or not a disk is present in each tray within the magazine M. To detect the presence of a disk in the tray, an optical detecting member 94 is installed near the clamper 192. The detecting member 94 checks as to whether or not the disks are present in the trays, through the opening O of the tray. More specifically, to make the check, the trays are successively pulled out of the magazine and set in the clamped position, and then the presence of the disk in each tray is checked by the detecting member 94. Accordingly, according to this check operation, a relatively long time is necessary to check the presence of the disks since each disk must be fully pulled out of the magazine and set in the clamp position.

As shown in FIG. 4, the clamper 192 is supported at the distal end of a clamp arm 193. A support shaft 194 is mounted on the distal end of the clamp arm 193. The support shaft 194 is inserted into the center portion of the clamper 192. A support plate 195 is mounted on the top end of the support shaft 194. A recess is formed in the center portion of the upper surface of the support plate 195. The recess receives a ball 196, which is mounted to the top of a projection 197 formed above the center portion of the clamper 192. The reverse side of the support plate 195 faces a surface 198. When the clamp arm 193 swings, the clamper 192 moves in a vertical direction. A rounded rise 201, located at the center portion of the clamper 192, is inserted into an opening placed in the center portion of the compact disk "d". When the rounded rise 201 engages with the support wheel 191, the compact disk "d" is rotatably held.

As shown in FIG. 4, the clamper 192 is tiltably supported at the distal end of the clamp arm 193. With this arrangement, when the clamp arm 193 swings, the attitude of the clamper 192 changes. Accordingly, the center of the clamper 192 does not necessarily coincide with the center of the opening 200 of the disk "d". More particularly, when the disk playback device is set in an erect position, the clamper 192 will go down and fails to hold the compact disk at the center portion. As indicated above, to clamp a disk, the clamper 192 is lifted through an opening of the tray "t" and cooperates with the support wheel 191 to clamp the disk on the tray "t". Referring to FIG. 5, when the clamper 192 is lifted and the disk is clamped between the clamper 192 and the support wheel 191, to gain a sure clamping, a-horseshoe disk guide 150 holds down and guides the upper surface of the disk. Three pins 151, 151 and 151 are planted on the disk guide 150, and are appropriately spaced from one another. The disk guide 150 is guided by the pins 151 to move in a vertical direction when a disk guide mechanism (not shown) is driven.

The disk guide 150 is installed at such a location as to hold the circumference of a compact disk having a large diameter of 12 cm. In this regard, it is rare that data is recorded in the portion of the disk near its circumference. Therefore, it is desirable that the disk guide 150 be installed at such a location on the disk. To guide the large disk, the disk guide 150 may be installed around the disk. However, with this installation, the disk guide 150 fails to guide a small compact disk "d1" of 8 cm in diameter. To hold the small compact disk "d1" on the tray "t", the adaptor ring S is put inside and along the circumference of the depression 181, and the small disk "d1" is placed in the space defined by the adaptor ring S.

The approach to hold the disk using the adaptor ring S, however, involves the following problem. The adaptor S, which is imprecisely finished, is often not correctly set in the depression 181. If the disk guide 150 holds down the incorrectly set adaptor, however, the small compact disk "d1" is displaced from the predetermined position.

Referring to FIG. 6, to avoid a horse-shoe disk guide 150 from obstructing the turning motion of the tray when the tray "t" is fed to the clamp position, the disk guide 150 is positioned above the upper surface of the tray "t" with a clearance C therebetween. To clamp the disk "d" placed in the tray "t", a clamper 192 is moved upward and causes the disk "d" to make contact with the disk guide 150. Under this condition, the clamper 192 is further moved upward, so that the disk "d" is nipped between the support wheel 191 and the clamper 192. To put the disk "d" back to the tray "t" after the data is played back from the disk, the clamper 192 is moved down to disengage the disk "d" from the clamper 192. At this time, the disk guide 150 descends up to a level as shown in FIG. 6. When the disk "d" is lowered, it should be correctly put back to the disk receiving depression 181 of the tray "t". However, the conventional disk playback device is not provided with a mechanism to correctly put the disk back to the depression. Therefore, in such a case, the disk "d" may be incorrectly placed in the disk receiving depression. Particularly where the disk playback device is used in an erected state, when the disk is made to disengage from the clamper 192, the related mechanism frequently fails to return the disk to the depression 181 of the tray "t". The frequency of the disk return failure when the playback device is used in an erected state is higher than that when it is horizontally placed in use. When the disk return failure occurs, the disk "d" incorrectly placed in the tray "t" is put back to the magazine, leading to jamming of the disk "d".

FIG. 7 shows a playback device 170 which includes means for detecting when a magazine is inserted in the device and when the magazine is locked in the device. More particularly, after the magazine M is completely inserted into the magazine housing 171, the tray "t" is pulled out of the magazine and transported to the data playback section 172. In this case, a magazine detect arm 104 detects that insertion of the magazine M is completed. A lock detect arm 103 detects the completion of locking the magazine M by a lock arm 107. After the insertion of the magazine is completed, the magazine M is locked so as not to be ejected from the magazine housing 171. The magazine detect arm 104 is swingable on an axis 111, and is biased counterclockwise as viewed in the drawing, by means of a spring 106. When the leading edge of the inserted magazine M comes in contact with the distal end of the magazine detect arm 104, the detect arm 104 is turned clockwise as viewed in the drawing, to operate a detect switch 110. When the lock arm 107 is put into a recess on the side wall of the magazine M, the distal end of the lock detect arm 103, which, together with the lock arm 107, is turned on an axis 108 to lock the magazine M, presses another detect switch 109, thereby to detect the completion of the locking the magazine by the lock arm 107. In this way, the completion of the insertion of the magazine M, and the completion of locking of the magazine M are detected in successive order. Following the successive detections, a desired tray "t" is transported to the data playback section, and a playback operation is carried out.

In the known disk playback device, two detect mechanisms are employed; one for detecting the completion of the magazine insertion, and the other for detecting the completion of locking the magazine. That is, the detect switches 109 and 110 are connected in series. The data playback operation will never start until both the switches are operated. It is clear that use of the two detect switches makes the detect mechanism complicated in construction, and that the complicated mechanism leads to an increase in manufacturing cost.

SUMMARY OF THE INVENTION

The disk playback device according to the present invention is of the type which includes a magazine containing a plurality of disks arranged in a stacked manner in a magazine housing, a tray for holding a disk in the magazine, and a tray turning mechanism for transporting a selected disk from the magazine to a data playback section containing a pick-up and the like. According to the invention, a disk is clamped and turned by a clamper, to play back data from the disk.

An object of the invention is to provide a disk playback device which securely holds a disk at a center portion thereof during a playback operation. More particularly, an object of the invention is to provide a disk playback device which reliably holds a disk between a clamper and a support wheel in such a manner that the clamper is moved in a direction which is orthogonal to an inserted compact disk, thereby making the center of the clamper coincident with the center of the disk.

To achieve the above object, the playback device includes guide means for moving the clamper in a direction which is orthogonal to the transported disk. The clamper is mounted to the distal end of a clamp arm through the guide means. The guide means moves the clamper in the direction orthogonal to the disk transported to the data playback section. With this guide means, the center of the clamper is coincident with the center of the disk. Therefore, the disk can be reliably held between the clamper and the support wheel.

Another object of the invention is to provide a playback device which takes a relatively short time to check the presence or absence of a disk in each of the trays of the magazine. To achieve this object, the playback device according to the invention includes a detecting member which is located close to, and outside of, a corner of the leading end of the magazine housing. This corner is located opposite to the axis about which the tray turns. Since the detecting member is located at such a position, it is not necessary for a disk to be transported to the playback section and clamped during the checking operation, that is, the tray can be slightly pulled out of the magazine to determine the presence or absence of a disk, thereby reducing the time necessary to complete the checking operation. Further, the position of the detecting member is such that both 8- and 12-cm diameter disks can be checked.

Another object of the invention is to provide a playback device which correctly places a disk back to a disk receiving depression of the tray after data is played back from the disk, even during unfavorable conditions such as when the device is in an erected state or when the device is subjected to vibrations. In order to achieve this object, the playback device includes a disk guide which, after a disk disengages from a clamper, raises up to a position where the disk comes into pressure contact with the upper surface of the tray, and when the tray is returned to the magazine, the disk guide retracts to a position just above the tray. With this feature, even during the above-indicated unfavorable conditions, the disk can be reliably placed in the disk receiving depression of the tray, thereby eliminating jamming of the disk and allowing a smooth movement of the tray.

Another object of the invention is to provide a disk playback device in which both 8- and 12-cm diameter disks can be reliably guided even in unfavorable conditions, such as when the playback device is in an upright position or when the device is subjected to vibrations. To provide this object, the playback device includes a disk guide which is disposed outside of the support wheel.

Another object of the present invention is to provide a disk playback device with a single detect mechanism which is simple in structure and low in cost.

To achieve this object, there is provided a disk playback device in which a magazine containing a disk is inserted into a magazine housing and set at a predetermined position, the disk is transported from the magazine to a data playback section including a pick-up and a spindle, which is for playing back data from the disk, when the magazine reaches the predetermined position, a magazine detect arm detects that the insertion of the magazine is completed, and a lock detect arm detects that the magazine is locked at the position where the insertion of the magazine is completed, characterized in that a detect switch is mounted on either of the magazine detect arm and the lock detect arm, and when the magazine detect arm moves to the position where the completion of the insertion of the magazine is detected, and the lock detect arm moves to the position where the lock of the magazine is detected, the detect switch mounted on one of the detect arms is operated by the other detect arm.

A detect switch is mounted to one of the two arms, the magazine detect arm and the lock detect arm, both being swingable. The detect switch mounted is disposed in opposition to the other. When the magazine detect arm is swung to the position where the completion of the insertion of the magazine is detected, and the lock detect arm is swung to the position where the lock of the magazine is detected, the detect switch mounted on one of the detect arms comes in contact with a part of the other, and is operated. Such an arrangement of the disk playback device requires only one detect switch. Accordingly, the detect mechanism is simple in structure.

DETAILED DESCRIPTION OF THE PREFERRED EMBODIMENTS

The preferred embodiments of a disk playback device according to the present invention will be described.

Figure 8:
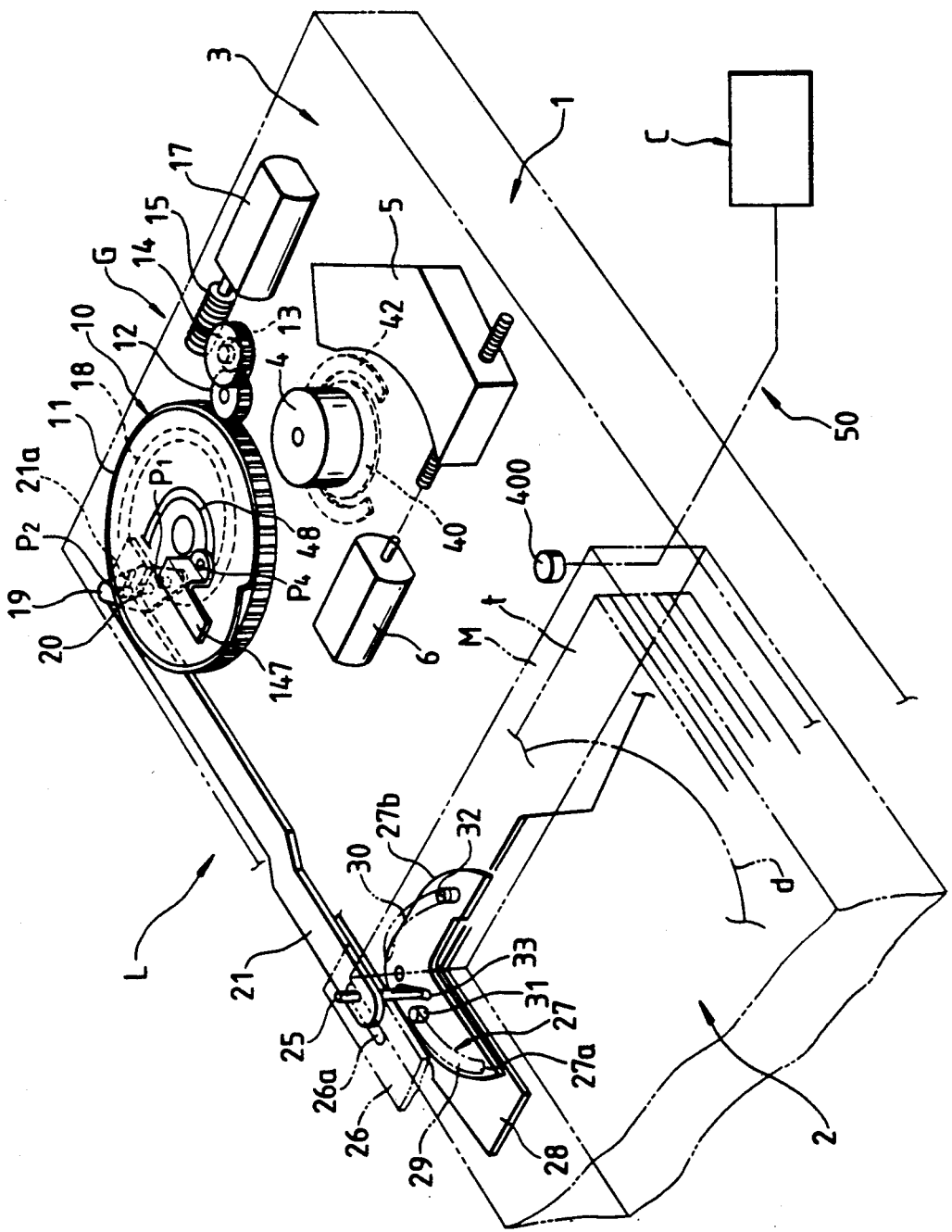
FIG. 8 is a perspective view showing a disk playback device according to the invention.

As shown in FIG. 8, a disk playback device 1 of the present invention includes a magazine housing 2 for housing a magazine M, and a data playback section 3 located adjacent to the magazine housing 2. A plurality of trays are contained in the magazine M in a stacked fashion. A compact disk is set at the center portion of each of the trays. A spindle motor 4 is disposed in the center portion of the data playback section 3, and a pick-up 5 is located adjacent to the spindle motor 4. The pick-up 5 moves in the radial direction of the compact disk, by means of a drive motor, thereby to read data from a compact disk transported from the magazine M to the data playback section 3. A tray turning mechanism 10 is disposed along two sides of the data playback section 3, which sides are orthogonal to each other. The tray turning mechanism 10 is provided with a large diameter cam gear 11 which is disposed at a corner of the data playback section 3. Teeth are formed on the circumferential surface of the cam gear 11. The gear 11 engages with a gear mechanism G which is further coupled with a reversible motor 17. More specifically, the gear mechanism G has a first gear 12, which engages with the teeth on the circumferential surface of the cam gear 11. The first gear 12 meshes with a second gear 13 which is integral with a third gear 14. The third gear 14 meshes with a worm gear 15 which is mounted to the shaft of the drive motor 17. The drive motor 17, which is a reversible motor, turns the cam gear 11 clockwise and counterclockwise. A cam groove 18 is formed in the reverse side of the cam gear 11. One end of an arm 19, which constitutes one end of a link mechanism L, engages with the cam groove 18 through a pin P1. The arm 19 may be turned about a shaft 20 mounted on a frame. Another pin P2 is provided at the other end of the arm. The arm 19 is coupled with a first lever 21 constituting a part of the link mechanism L, through the pin P2.

The pin P2 engages with, and is guided by, a laterally extending elongated groove 21a which is formed in the distal end of the first lever 21. A vertically extending pin 25 is provided at the base portion of the lever 21. The pin 25 engages at the top with an elongated hole 26a of a frame 26, while it engages at the bottom with an elongated hole 33 of a tray turning member 27 located at the left corner of the magazine M housed in the magazine housing 2. The tray turning member 27 is shaped like a capital "L", and consists of an arm 27a extending along the side wall of the magazine M, and another arm 27b extending along the front side of the magazine M.

The arm 27a of the tray turning member faces a part of the tray which projects from an opening which is formed in the leading end portion of the side wall of the magazine M. The arm 27b faces the leading ends of the trays stacked in the magazine M. A pin 31 downwardly protrudes from the bottom surface of the arm 27a, and a pin 32 protrudes from the arm 27b. The pin 31 engages with an arc-shaped hole 29 formed in a frame 28, and the pin 32 engages with an arc-shaped hole 30. The tray turning member 27 is turned within a range of 90 degrees, which is defined by the arc-shaped holes 29 and 30. When the member 27 is turned counterclockwise, as viewed in FIG. 8, a tray facing the arm 27a is turned about an axis shaft mounted at the corner of the magazine M. After the tray is fed to a predetermined position in the data playback section 3, the tray is stopped. When the member 27 is turned clockwise, the tray fed to the data playback section 3 is returned to the original position in the magazine M.

Figure 9:
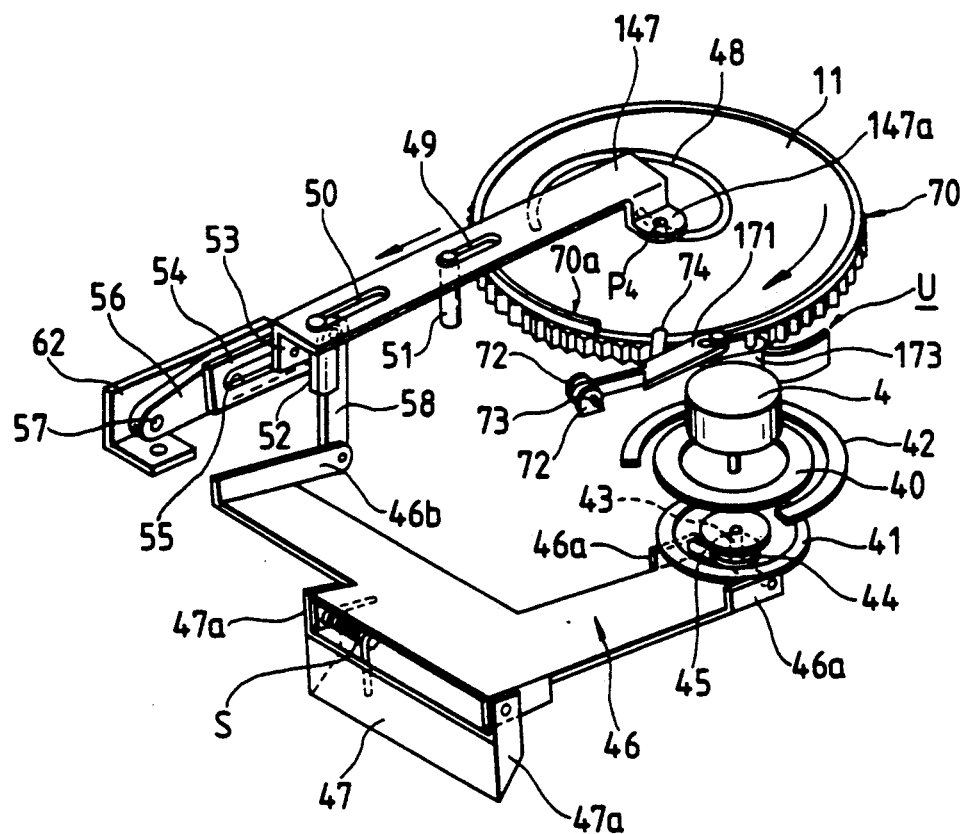
FIG. 9 is a perspective view showing a clamper mechanism and a disk guide lift mechanism according to the invention.
Figure 10:
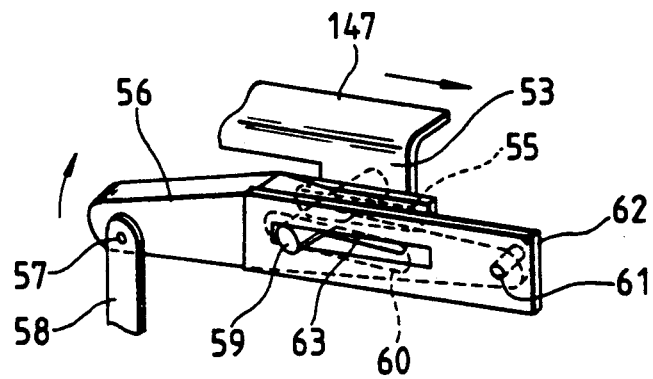
FIG. 10 is a side view for explaining the engagement of an operating arm and a swing arm.

As shown in FIG. 9, a specially configured cam groove 48 is formed in the upper surface of the cam gear 11. A pin P4, mounted on a lug 147a at the free end of an operating arm 147 extending substantially parallel to the lever 21 of the link mechanism L (FIG. 8), engages with the cam groove 48. Elongated holes 49 and 50, formed in the operating arm 147, are spaced from each other. The top end of a pole 51 engages with the elongated hole 49, and the top end of a pole 52 engages with the elongated hole 50. The combination of the holes and poles serves to guide a reciprocating motion of the operating arm 147. A lug 53, formed in the base end portion of the operating arm 147, is bent downwardly. As shown in FIG. 10, a guide pin 59 is laterally protruded from the lug 53. A guide plate 54 is disposed adjacent to the lug 53 having an elongated hole 55. A swing arm 56 is disposed adjacent to the guide plate 54. The swing arm 56 is swingably coupled with one end of the guide plate 62 by means of an axial pin 61. The guide plate 62 also has an elongated hole 63, which is parallel to the elongated hole 55, and whose length is equal to that of the hole 55. A slanted hole 60 is formed in the swing arm 56. The guide pin 59 passes through the horizontal holes 55 and 63 of the guide plates 54 and 62, and the slanted hole 60 of the swing arm located between those guide plates. With such a structure, when the operating arm 147, as postured in FIG. 10, is moved to the right, the guide pin 59 is also moved to the right. The guide pin 59 travels along the horizontal holes 55 and 63 of the guide plates 54 and 62. With this movement of the guide pin 59, the swing arm 56 with the slanted hole 60 is turned clockwise about an axial pin 61, to lift its left end as viewed in the drawing. The base end of the swing arm 56 is coupled with a link 58 by means of an axial pin 57. The bottom end of the link 58 is rotatively coupled with a coupling plate 46b extended from the free end of a clamper support plate 46.

Figure 11:
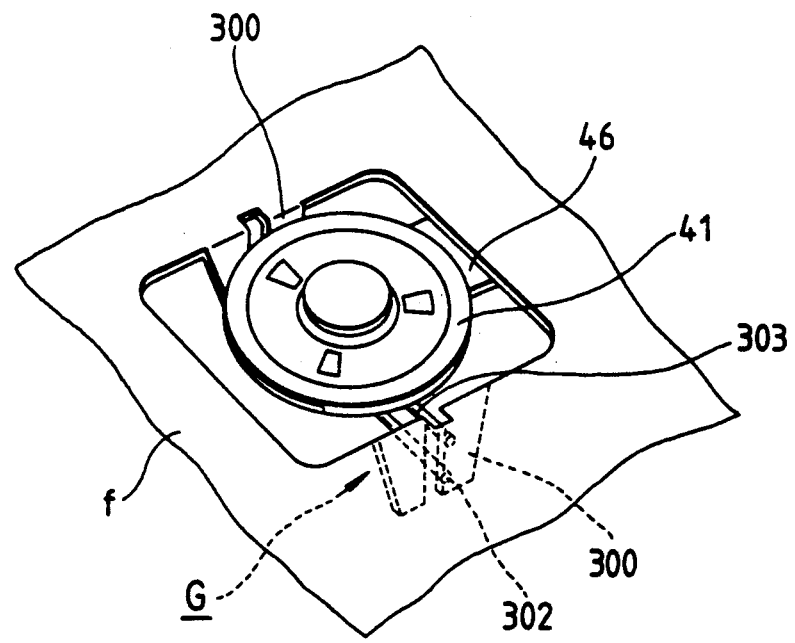
FIG. 11 is a perspective view of the clamping mechanism according to the invention.
Figure 12:
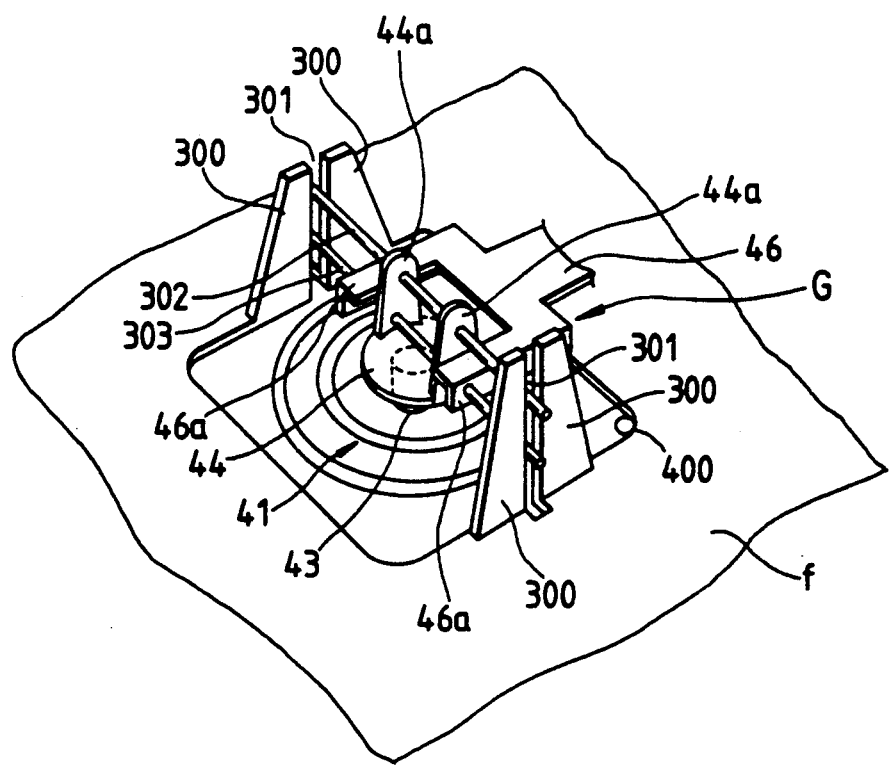
FIG. 12 is a perspective view of the clamping mechanism of the invention.

The clamper support plate 46 is swingably supported by a pair of support lugs 47a and 47a of a fixed plate 47. As best illustrated in FIGS. 11 and 12, a pair of parallel support lugs 46a and 46a are formed at the distal end of the clamper arm 46. To the paired supports 46a and 46a, a guide mechanism G guides the clamper 41 in the direction orthogonal to the disk "d" as transported from the magazine. The guide mechanism G is provided with a pair of support bars 302 and 303, which are vertically arrayed and spaced from each other and extend horizontally. The support bar 303 closer to the frame "f" passes through the paired supports 46a and 46a provided at the distal end of the clamper arm 46. Both ends of the paired support bars 302 and 303 are placed in guide slits 301 and 301 each defined by a pair of guide plates 300 and 300. The pair of guide plates 300 and 300 are erected at the opposite sides of a square opening formed in the frame "f". The guide slits 301 extend in a direction which is orthogonal to the surface of the transported disk, viz., in the vertical direction of FIGS. 11 and 12. The support bars 302 and 303 are supported at the mid portion by support plates 44a and 44a, which stand in an upright position on opposite sides of a support member 44. A disk of the support member 44 is coupled with the clamper 41 through a shaft 43. The top end of the shaft 43 engages with the center portion of the clamper 41 with a play therebetween. With this arrangement, the clamper 41 is swingably mounted on the top end of the shaft 43.

Figure 13:
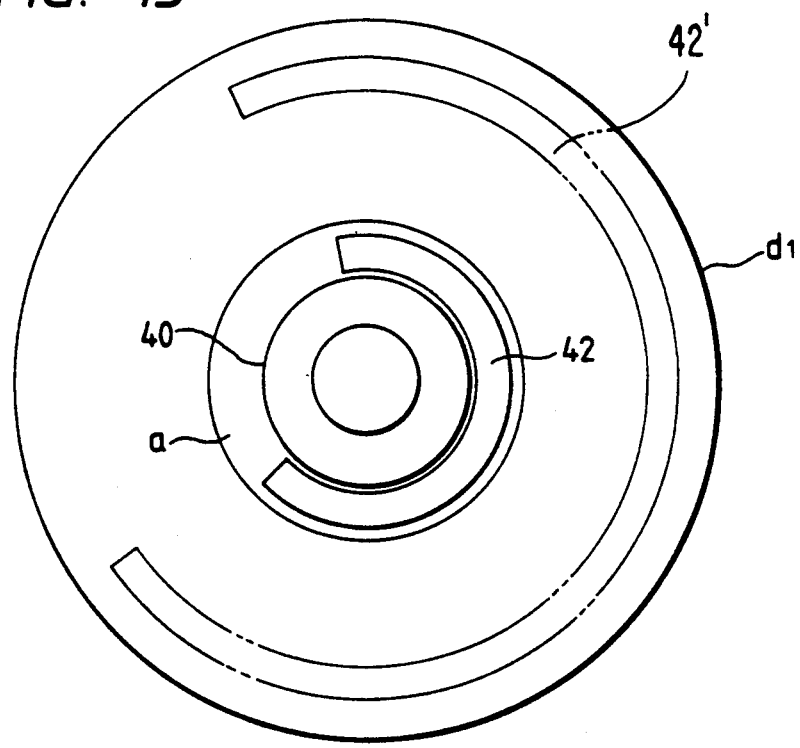
FIG. 13 is a plan view showing a disk guide lay out.
Figure 14:
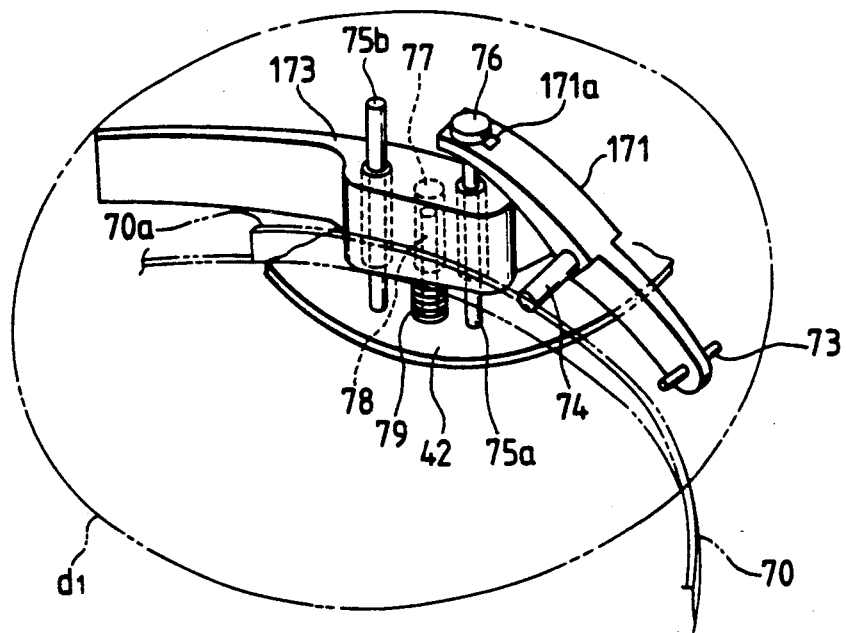
FIG. 14 is a perspective view showing a disk guide lift mechanism according to the invention.
Figure 15:
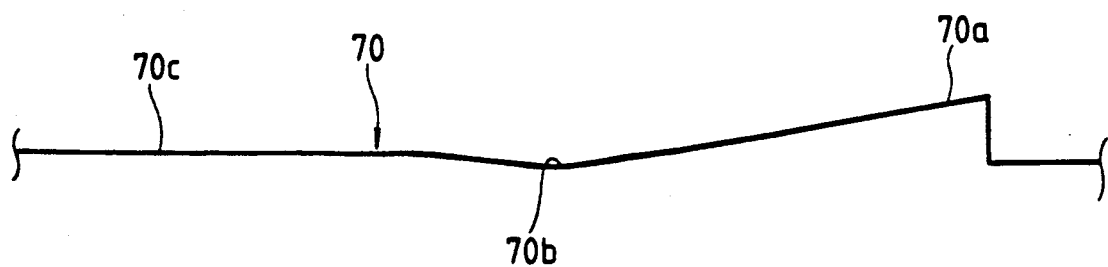
FIG. 15 is an explanatory diagram showing the cam surface of a cam according to the invention.
Figure 16A:
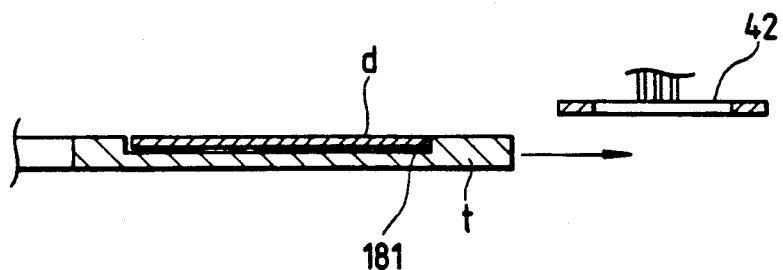
FIGS. 16(a) and 16(b) are explanatory diagrams for explaining a disk guide operation.
Figure 16B:
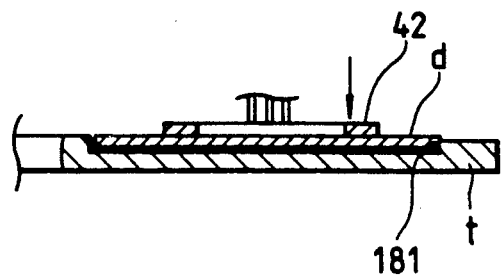

When the cam gear 11 is turned and the clamper arm swings, the guide mechanism M guides and moves the clamper 41 in the direction orthogonal to the surface of the disk transported to the data playback section. Therefore, the center of the clamper 41 is always coincident with the center opening of the disk. Accordingly, the clamper 41 may be moved in the direction orthogonal to the surface of the disk when the disk playback device is put in a horizontal position as well as in a vertical position. Thus, the disk can reliably be clamped at the center portion irrespective of the attitude of the playback device. As shown in FIG. 13, a horse-shoe shaped disk guide 42 is disposed around a support wheel 40, which is driven by the spindle motor 4. Referring to FIG. 9, the disk guide 42 is vertically moved by a disk guide lift mechanism U. As shown in FIGS. 9 and 14, the mechanism U is provided with a follower arm 171. One end of the follower arm 171 is rotatively coupled with an axial pin 73 supported by a pair of supports 72 and 72 (FIG. 9). The other end of the follower arm 171 has a coupling hole 171a. The top end of the guide pin 75, which is planted on the disk guide 42 is inserted into and coupled with the top end by means of a large diameter head 76. The guide pin 75 vertically extends through a through-hole of a fixed member 173. The disk guide 42 is supported by guide pins 74 and 78, in addition to the guide pin 75. The guide pin 78 located between the guide pins 75 and 74 is inserted into a hole 77 whose one end is closed. The hole 77 is formed in the fixed member 173. A compression spring 79 is disposed between the lower surface of the fixed member 173 and the upper surface of the disk guide 42. The guide pin 78 is slidably inserted into the compression spring 79. The spring 79 constantly biases downwardly the disk guide 42. A cam follower 174 is planted on the center portion of the side wall of the swing arm 71. The cam follower 174 is in contact with a cam 70, which is formed on the circumferential edge on the upper surface of the disk guide. A tapered cam 70a extends in a fixed angular range. When the cam follower 174 rides on the high portion of the cam 70a, the guide pin 75 pulls up the guide disk 42 from the fixed member 173. As shown in FIG. 15, the tapered portion 70a is contiguous to a depression 70b which is contiguous to a substantially horizontal portion 70c. The link mechanism L operates to turn the tray turning member 27 counterclockwise by 90 degrees, from a state of the tray turning member shown in FIG. 8, so that one of the trays contained in the magazine M is pulled out of the magazine and is exactly set in the clamp position. At this time, the cam follower 74 of the swing arm 171 slides on the horizontal portion 70c of the cam 70, so that the disk guide 42 is lifted and positioned above the tray "t", as shown in FIG. 16(a). When the tray "t" reaches the clamp position, the cam follower 74 slides down to the depression 70b. The disk guide 42 descends to such a position where it slightly presses the surface of the disk "d", as shown in FIG. 16(b). Then, the operating arm 147 moves to the left as viewed in the drawing from its state shown in FIG. 9, and turns the clamp support plate 46, to lift the clamper 41, which is supported by the free end of the clamper support plate. With the lift motion, the cam follower 74 of the swing arm 71 rides on the tapered cam 70a on the circumferential edge of the cam gear. The disk guide 42 comes in contact with the upper surface of the disk, from a lower position, and progressively moves upward while guiding it, as the clamper 41 lifts. The cam grooves 18 and 48, and the cam 70 are shaped so that the tray turning member 27, the clamper 41, and the disk guide 42 operate in the time sequence as mentioned above. When the disk is returned to the magazine M, the cam gear 11 is reversely turned, and the clamper 41 descends. With this, the disk guide 42 also descends by an expansion of the compression spring 79, and is set in the tray. At this time, the cam follower 74 of swing arm 71 slides on the horizontal portion 70c of the cam 70 so that the disk guide 42 is lifted and positioned above the tray "t", as shown in FIG. 16a. When the tray "t" reaches the clamp position, the cam follower 74 slides down to depression 70b. The disk guide descends to a position where it slightly presses the surface of the disk "d", as shown in FIG. 16(b). Even when the disk "d" is incorrectly placed in the disk receiving depression 181, the disk guide 142 guides the disk and correctly places it in the depression 181. Thus, the disk after disengaged from the clamper is pressed down on the tray "t". Accordingly, if the disk is put out of the disk receiving depression 181, the disk will be correctly set therein. According to this arrangement, the disk can be correctly set in the depression 181 even if the disk playback device is used in an erected state or is subjected to vibrations. This is also true for the small diameter disks which require an adapter ring when it is placed in the tray. Then, the tray turning member 27 is reversely turned to return the tray into the magazine M.

The horse-shoe disk guide 42 is preferably covered with soft material, such as felt. A preferable mounting position of the disk guide is outside the support wheel 40 and within a read-in area "a" at the center portion of the small compact disk "d1" where no data is recorded (FIG. 13). The reason why the disk guide 42 is shaped like a horse shoe is that the pick-up must be inserted through its opening.

It is not essential to locate the disk guide 42 within the read-in area "a". If required, it may be positioned within the diameter of the 8 cm-compact disk "d1" but in a location near the circumferential edge of the disk.

With the structural arrangement as mentioned above, the small compact disk of 8 cm in diameter as well as the large compact disk of 12 cm can be reliably guided even in unfavorable conditions, for example, when the playback device is used being subjected to vibration, and when the playback device is put in an erect position. Further, when the disk guide is disposed within a read-in area on the disk, the disk guide will never damage the data recorded area on the disk.

Figure 17:
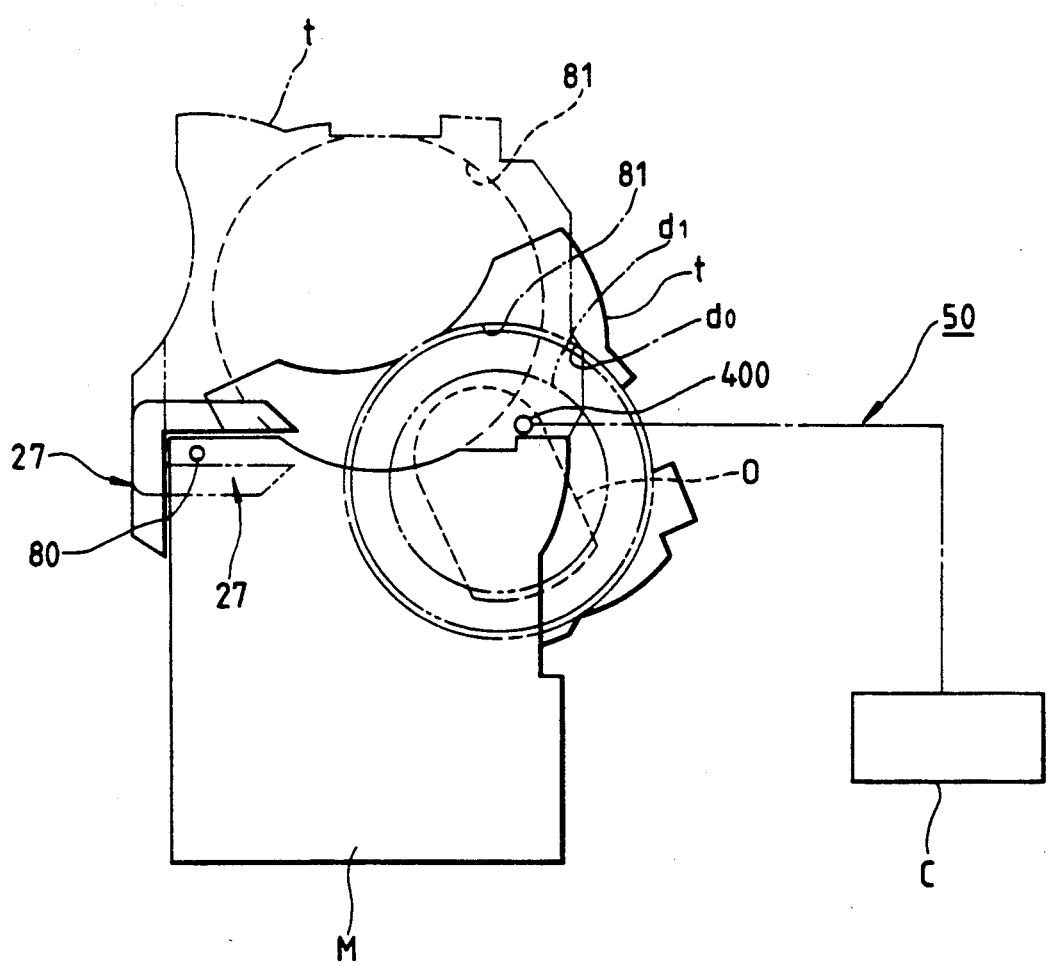
FIG. 17 is a plan view showing a magazine and tray assembly of the invention.

As shown in FIGS. 8 and 17, the disk playback device of the present invention is provided with a detector unit 50 for detecting whether or not a disk is set in a depression of each tray within the magazine M. The detector unit 50 is provided with a detect member 400, for example, an optical detector element which is located close to and outside the corner of the leading end of the magazine, which is opposite to the center about which the magazine M turns, viz., the corner where an axis 80 is provided. The detect member 400 is coupled with a controller C. The detect member 400 is mounted at such a location that it is within an opening O of the tray "t" when the tray is slightly put out of the magazine M toward the data playback section, and that it can detect not only the compact disk "do" of a large diameter but also the compact disk "d1" of a small diameter. The detect member 400 is located apart from the spindle motor or the clamper 92 as shown in FIG. 8, and further is located outside the large compact disk "do". Therefore, if the tray "t" is put out of the magazine, and set at the clamp position in the data playback section, the large compact disk "do" may smoothly turn without being obstructed by the tray "t". Thus, the detect member 400 is located such that when the tray "t" is slightly put out of the magazine M toward the playback section, the small compact disk "d1" whose diameter is 8 cm as well as the large compact disk "do" whose diameter is 12 cm passes the detect member 40 and that then the tray "t" is turned up to the clamp position, it does not obstruct the turning of the large disk "d1" and the small disk "do" as well. Therefore, the detect member can quickly detect whether or not the disk is set in each of the trays for those disks "d1" and "do" when the tray "t" is slightly pulled out of the magazine M.

With such an arrangement, the presence or absence of the 12 cm- and the 8 cm-compact disks within the trays can be detected in a state that the tray "t" is slightly put out of the magazine, not in a state that it is completely put out of the disk and set at the clamp position. Therefore, such a detection can be completed in a short time.

Another embodiment of the present invention will be described with reference to FIGS. 17-20.

Figure 18:
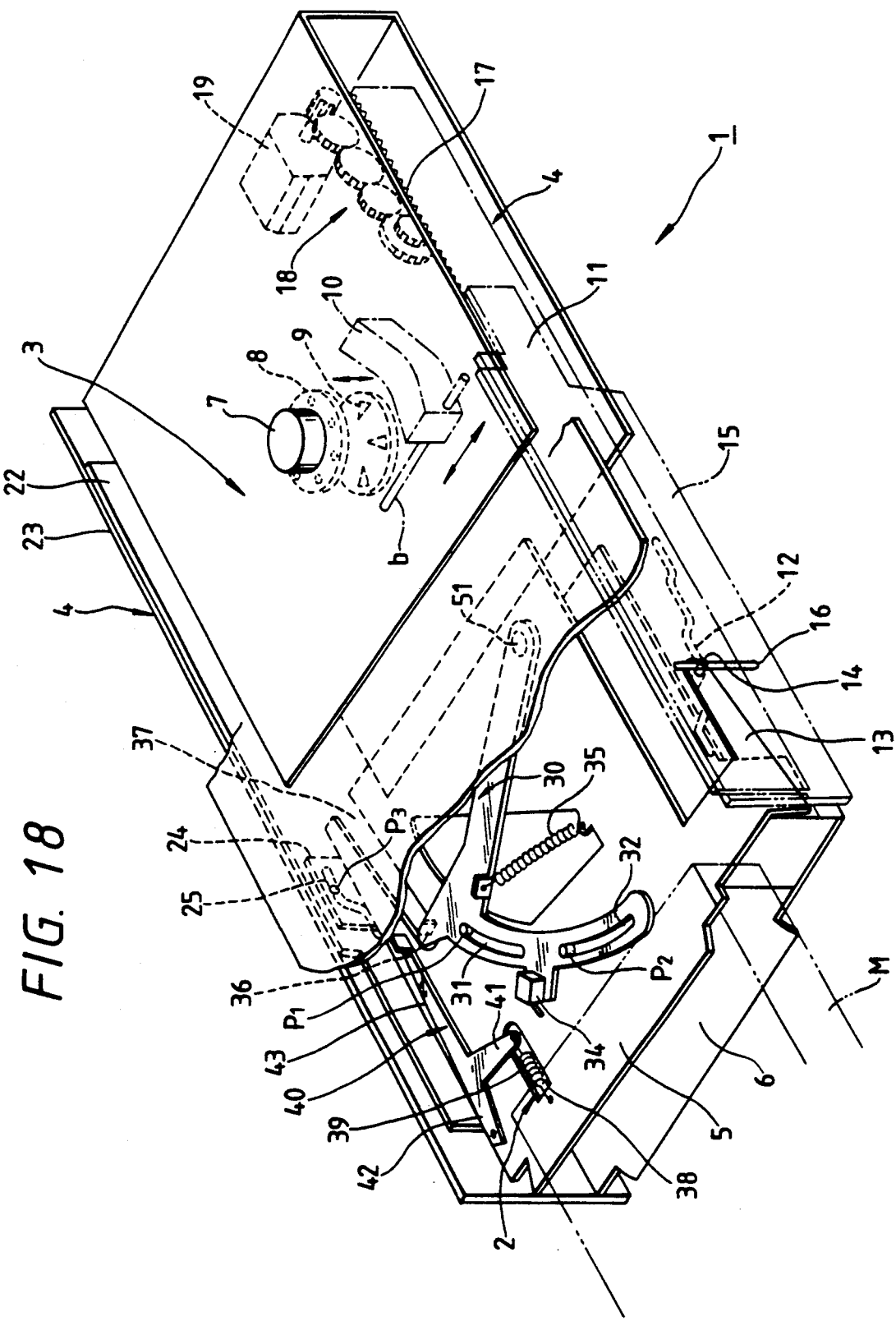
FIG. 18 is a perspective view showing a disk play back device according to the invention.
Figure 19:
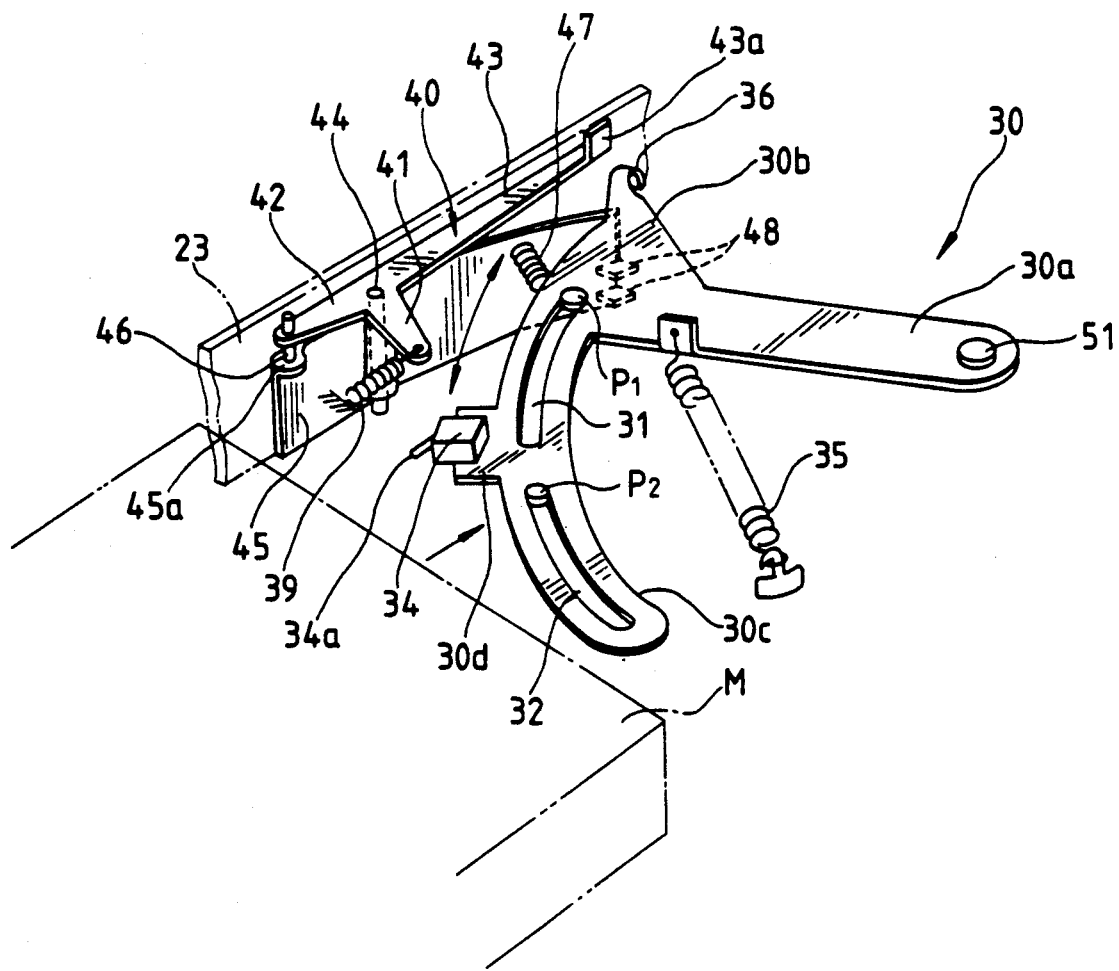
FIG. 19 is a perspective view showing a detecting mechanism according to the invention.

Referring to FIGS. 17 and 18, a disk playback device according to the present invention includes a magazine housing 2 and a data playback section 3. A magazine M storing a number of compact disks arranged in a stack, is inserted into the magazine housing 2. The playback section 3, located adjacent to the magazine housing 101, plays back data from a compact disk. A pair of lift mechanisms 4 for lifting the magazine housing 2 are installed on both sides of the disk playback device 1.

The magazine housing 2 includes upper and lower frames 5 and 6, which are oppositely disposed. The magazine M is inserted, and held between the upper and the lower frames 5 and 6. A spindle motor 7 is disposed in the center portion of the data playback section 3. Paired clampers 8 and 9 are disposed under the motor 7. A compact disk pulled out of the magazine M is set between the clampers 8 and 9, and clamped by them. A pick-up 10, located adjacent to the motor 7, is movable in the radial direction of the compact disk, along a guide rod "b".

The lift mechanism 4 is provided with an operating plate 11. An elongated guide hole 12 as stepwise shaped is formed in an end portion of the operating plate 11. A pin 14 engages with the guide hole 12. The pin 14 is protruded from an arm 14, which outwardly extends from the side of the upper frame 12. The pin 14 also engages with a vertical elongated hole 16 of a side frame 15. The operating plate 11 has a rack on the upper side, which is located closer to the other end of the operating plate. The rack portion 17 is in mesh with one of a train of gears 18. The gear train 18 is driven by a drive motor 19. As already stated, the couple of lift mechanisms are installed on both sides of the disk playback device, which is opposite to the side with the operating plate 11 installed thereon. An operating plate 22 is installed on the inner side of the side frame 23. The operating frame 23 has also an elongated, stepped guide hole 25. A pin P3, which engages with the guide hole 25, is protruded from a support lug 24, which is extended from the side wall of the upper frame 5. The operating plates 11 and 22 on the right and left sides of the playback device as viewed in the drawing are coupled with each other by means of a link (not shown). When the drive motor 19 operates, a rotating force generated by the motor is transferred through the gear train 18 to the operating plate 11. Then, the operating plate 11 slides in both directions. With the sliding of the plate, the pin 14, which is mounted to the arm 13 protruded from the upper frame, horizontally moves along the stepped guide hole 12 and vertically moves along the vertical hole 16. Consequently, the magazine housing 2 vertically moves. Such a vertical motion of the magazine housing 2 is used to position a tray carrying a desired disk at the entrance of the data playback section.

Figure 21:
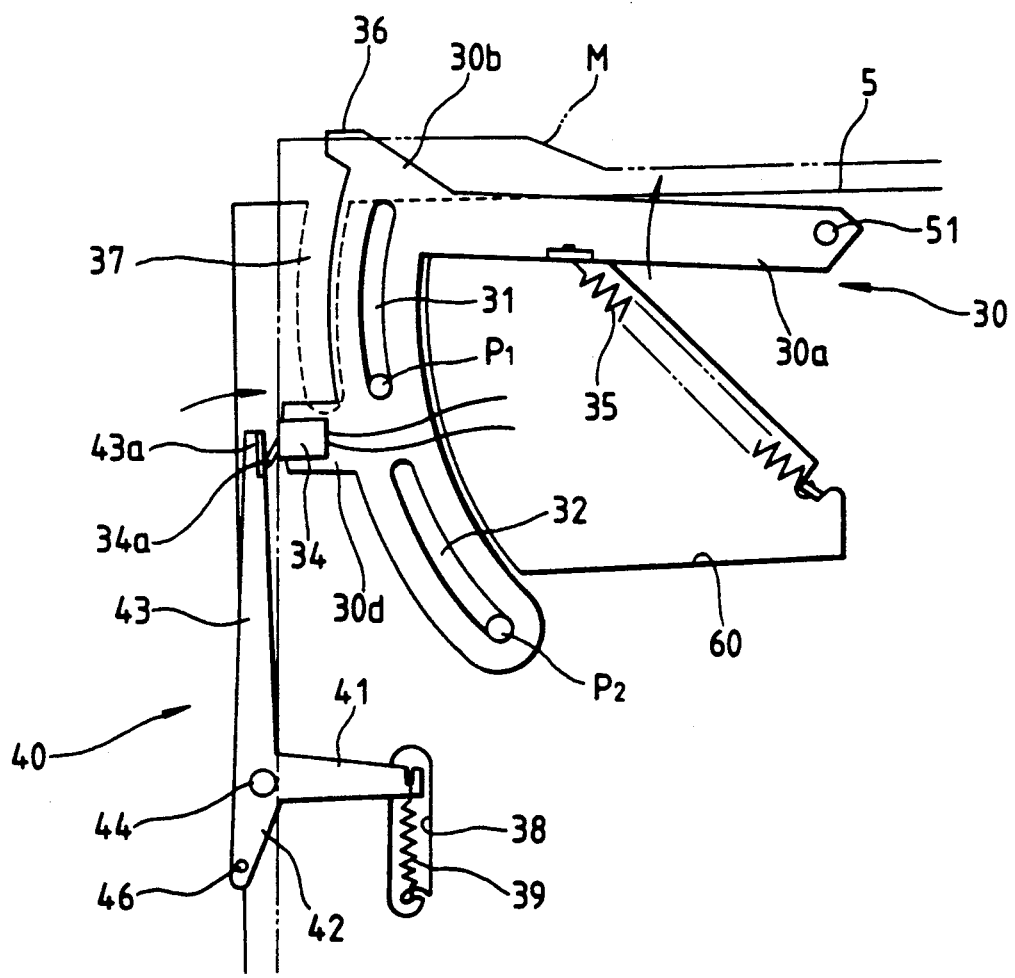
FIG. 21 is a plan view showing a lock mechanism when a magazine insertion operation is completed.

As shown in FIG. 21, magazine detect arm 30 shaped like a capital "L" is swingably installed on the upper frame 5 of the magazine housing 2. The detect arm 30 has a base portion 30a. One end of the base portion 30a is coupled with an axis 51. A tension spring 35 biases the base portion 30a in the counterclockwise direction as viewed in the drawing. The magazine detect arm 30 further contains another portion 30b contiguous to and extending from the other end of the base portion 30a toward the outside of the magazine housing. A stopper 36, which is downwardly bent from the top of the portion 30b, is in contact with the leading edge of the magazine. The magazine detect arm 30 contains an additional portion 30b, and is in contact with the leading edge of the magazine. The magazine detect arm 30 contains an additional portion 30c shared like arc contiguous to and extending from the other end of the base portion 30a. A couple of elongated holes 31 and 32 shaped like arcs also are separately formed in the arm 30c. Pins P1 and P2 respectively engage with the elongated holes 31 and 32. When the magazine detect arm 30 swings, the pins P1 and P2 guide the detect arm, and cooperate with the elongated holes 31 and 32 to limit a range of the swing of the detect arm 30. Those pins are fixed to the upper frame 5.

A support 30d is outwardly protruded from the circumference of the arc-shaped portion 30c. A detect switch 34 is mounted on the support 30d. The switch 34 is provided with an actuator 34a.

A lock detect arm 40, which cooperates with the magazine detect arm 30, is formed on the side wall of the magazine housing 2. The lock detect arm 40 is branched into three portions, a first portion 41 extending toward the center of the magazine housing, a second portion 42 which is short and extends along with the side wall of the magazine housing, and a third portion 43 which is narrow and long and also extends along with the side wall of the magazine housing. A stopper 43a is formed at the distal end of the third portion 43. The lock detect arm 40 is swingable on an axis 44. The axis 44 also serves as an axis for a lock plate 45 located under the lock detect arm 40. A lug 45a is formed at the trailing end of the lock plates 45. A pin 46 is fixed to the lug 45a. The top end of the pin 46 is coupled with the second portion 45 of the lock detect arm 40. The top of the first portion 41 is coupled with one end of a tension spring 39 whose other end is fixed to the upper frame 5. The spring 39 biases the detect arm 40 in the clockwise direction as viewed in the drawings. An end portion of the lock plate 45 is bent toward the inside. A pair of lock parallel projections 48 and 48 are projected from an end portion of the lock plate 45 toward the inside. The lock plate 45 is resilient and made of synthetic resin. The end portion of the lock plate 45 is biased toward the inside by a compression spring 47. As described above, the lock detect arm 40 and the lock plate 45 are mounted to the axis 44. The top of the second portion 42 of the lock detect arm 40 is coupled with the lug 45a through the pin 46. Accordingly, the lock detect arm 40, together with the lock plate 45, swing in the same direction.

An operation of the disk playback device according to this embodiment will be described.

As shown in FIG. 17, the magazine M is inserted into the magazine housing 2, and the leading edge of the magazine M reaches a predetermined position in the housing, and then the stopper 36 of the magazine detect arm 30 hooks the leading edge of the magazine. At this time, the magazine M goes forward while its side walls outwardly push the free end portion of the lock plate. Accordingly, the lock plate 45 and the lock detect arm 40 are turned counterclockwise.

Figure 1:
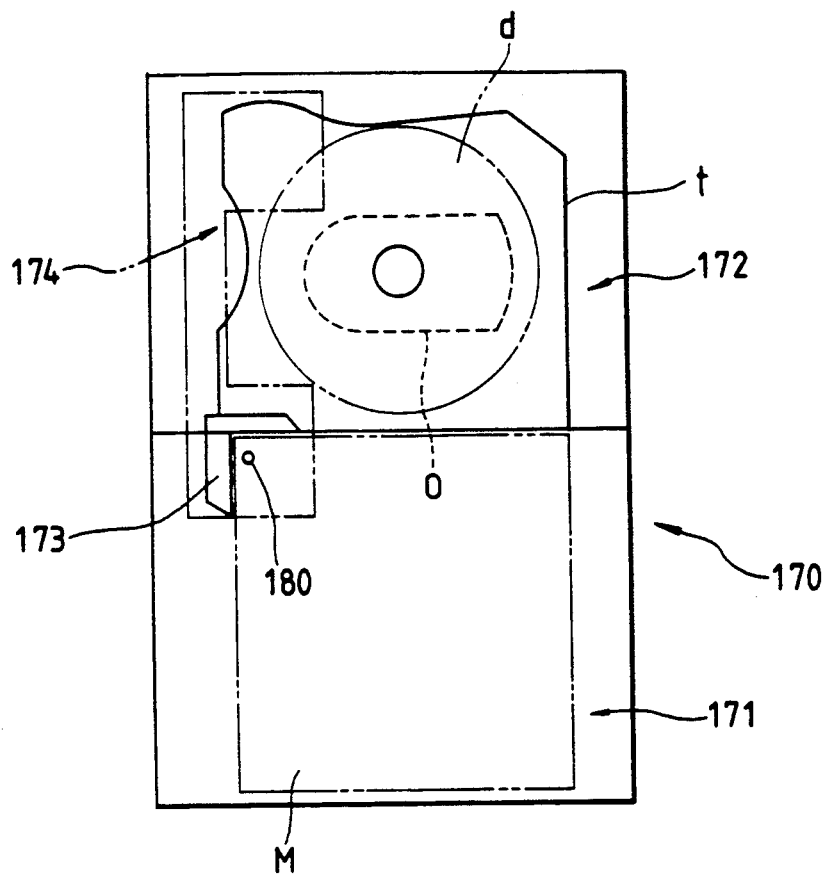
FIG. 1 is a plan view of a known disk playback device.
Figure 2:
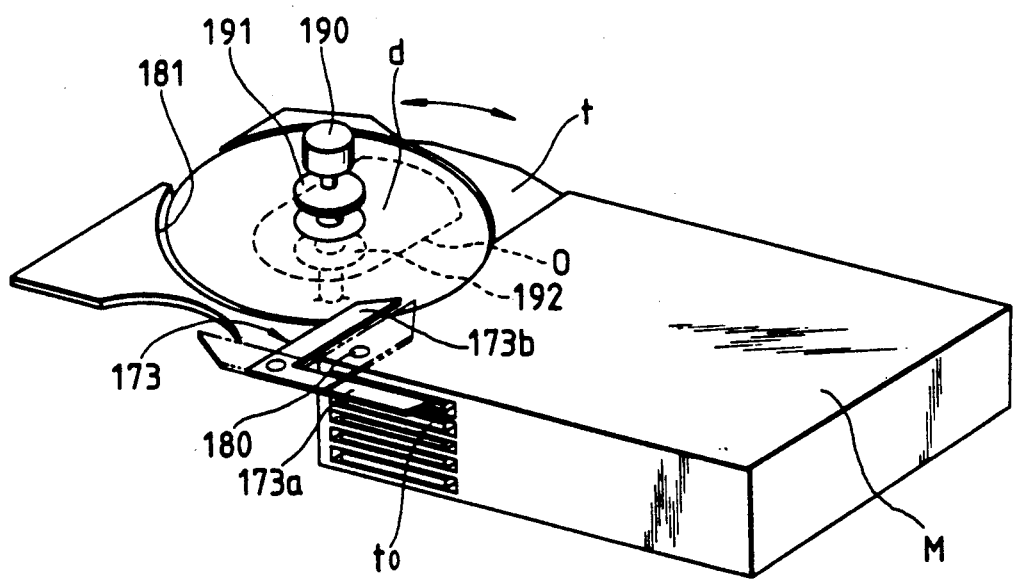
FIG. 2 is a perspective view showing the assembly of the playback device of FIG. 1.
Figure 3:
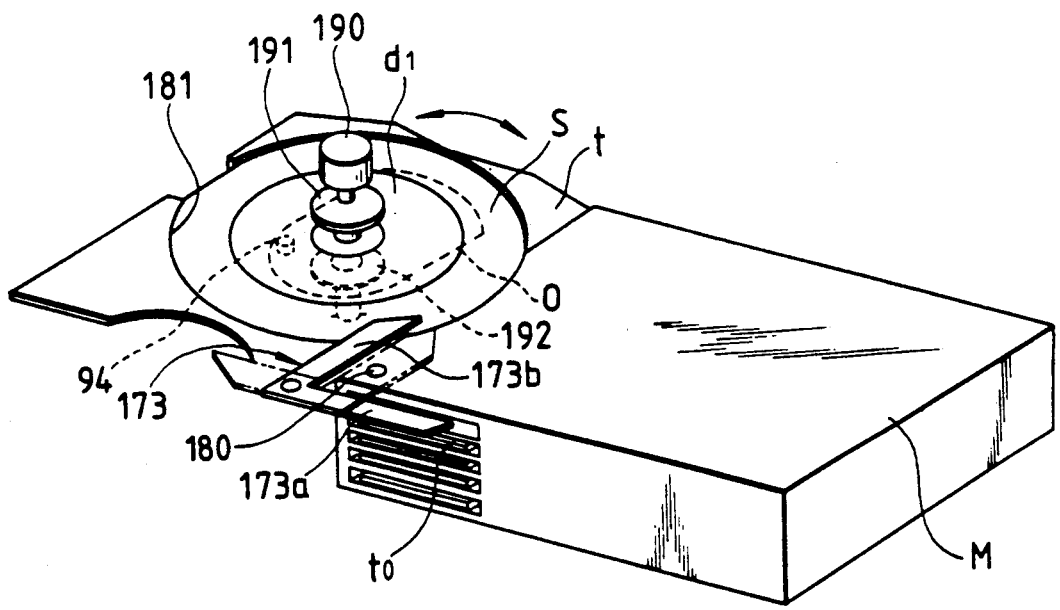
FIG. 3 is a plan view of a known playback device.
Figure 4:
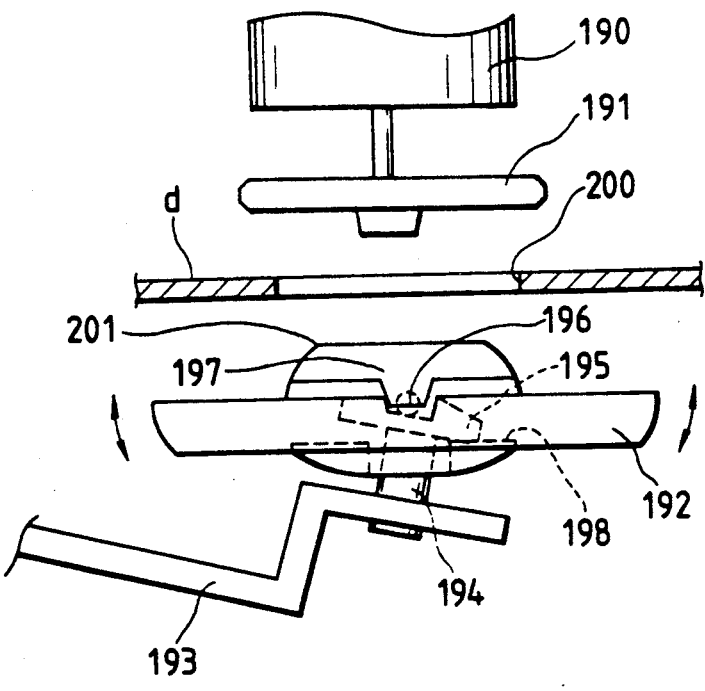
FIG. 4 is a sectional view of a known clamping mechanism.
Figure 5:
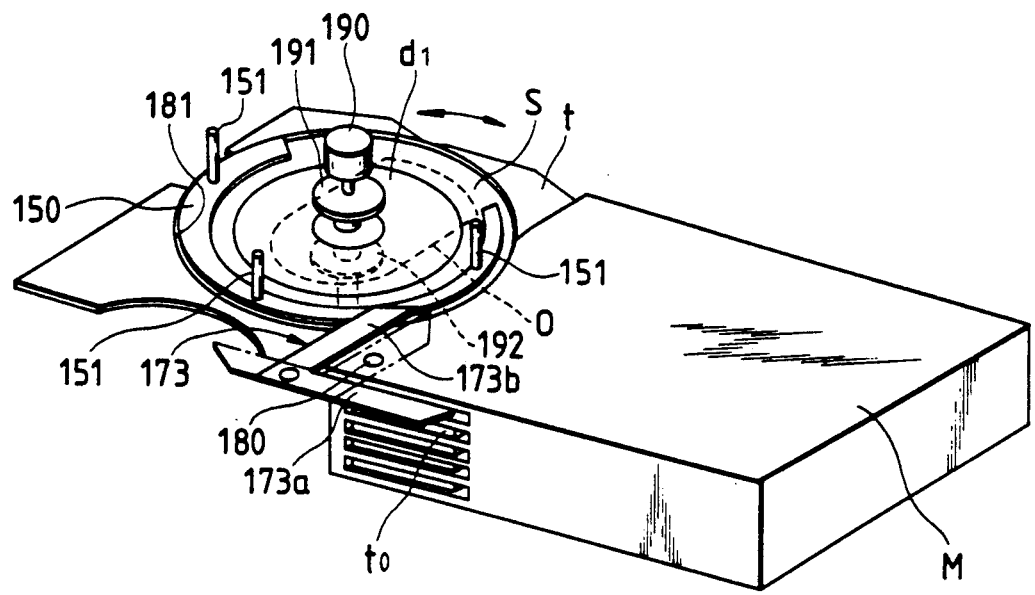
FIG. 5 is a plan view of a known playback device.
Figure 6:
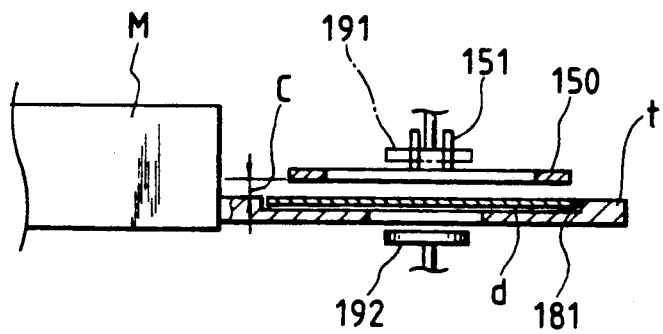
FIG. 6 is a sectional view showing a known disk guide and tray mechanism.
Figure 7:
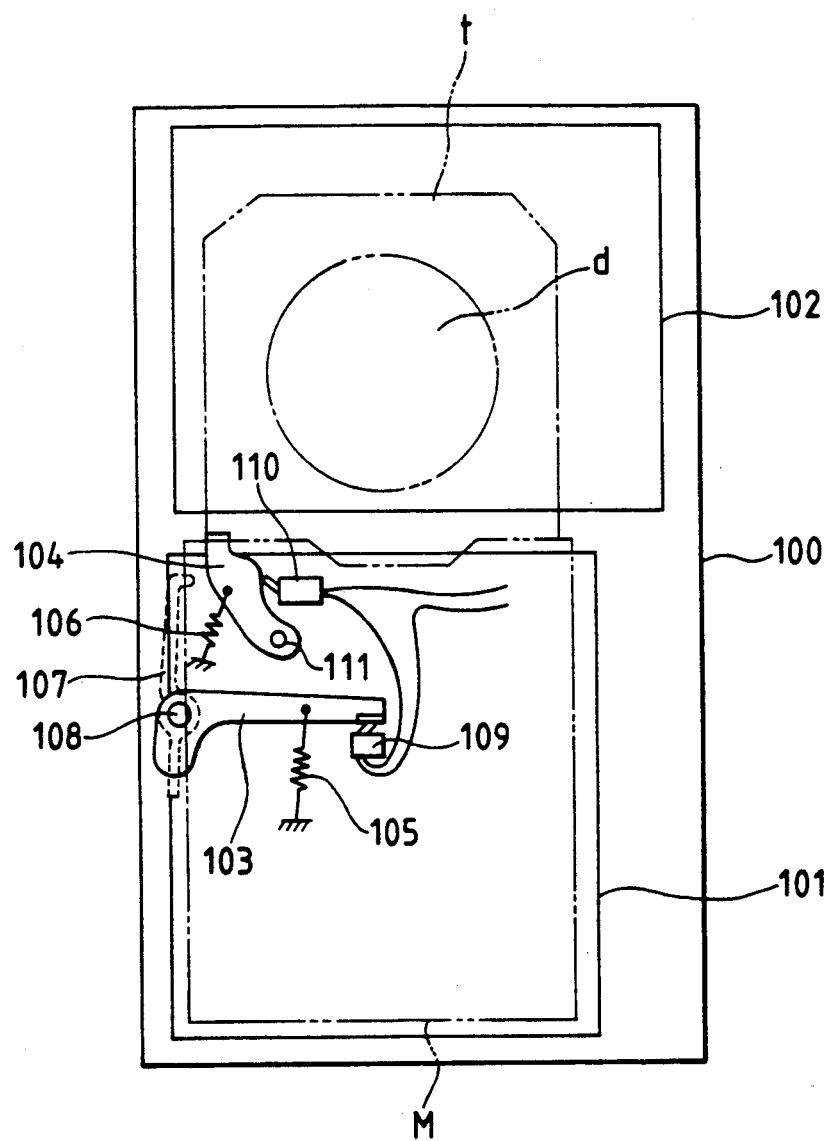
FIG. 7 is a plan view of a known disk playback device.
Figure 20:
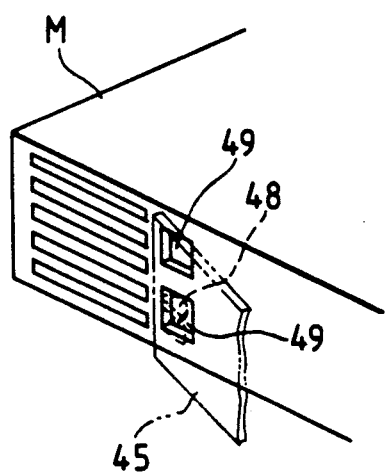
FIG. 20 is an explanatory diagram for explaining how a lock plate engages the side wall of a magazine.

When the insertion of the magazine M is completed, the innards of the magazine housing is as shown in FIG. 20. As shown, the magazine detect arm 30 is turned clockwise while expanding the tension spring 35. When the leading edge of the magazine M reaches the predetermined position, the pins P1 and P2 engaging with the arc-shaped holes 31 and 32, respectively, come in contact with the extreme ends of the holes 31 and 32. At this time, the actuator 34a of the switch 34 mounted on the support 30d contacts the stopper 44 at the distal end of the long third portion 43 of the lock detect arm 40, to operate the switch 34. When the magazine M reaches the predetermined position and the insertion of the magazine is completed, a pair of recess 49 formed in the side wall of the magazine M as shown in FIG. 3 face the pair of projections 48 and 38 projected from the end portion of the lock plate 45, and the paired projections 48 are inserted into the recesses 49, respectively. At this point, the lock of the magazine is completed. When the paired projections 48 are inserted into the recesses 49 formed in the side wall of the magazine, the lock plate 45 is turned clockwise by the compression spring 47, the lock detect arm 40 is also turned clockwise. The stopper 43a mounted on the top of the long third portion 43 drives the actuator 34a of the detect switch 34. When the stopper 36 of the magazine detect arm 30 comes in contact with the leading end of the magazine M, the arm 30 is turned and reaches the position where the insertion of the magazine M is completed, the detect switch 34 moves to a position where it faces the stopper 43a of the lock detect arm 40. Under this condition, the paired projections 48 of the free end portion of the lock plate 45 are inserted into the paired recesses 49 in the side wall of the magazine M, to complete the locking of the magazine, and the lock detect arm 40 is turned clockwise as viewed in the drawing, to operate the detect switch 34.

While in the embodiment as mentioned above, the detect switch 34 is mounted on the magazine detect arm 30, it may be mounted on the lock detect arm 40. In this case, a stopper is formed on the magazine detect arm at a location where it faces the detect switch. The spring 35 biasing the magazine detect arm 30 counterclockwise is turned within a recess 60 formed in the upper frame 35. The tension spring 39 biasing the lock detect arm 40 clockwise is extended and compressed within a recess 61 formed in the upper frame 5.

With an arrangement of the disk playback device as described above, use of a single detect switch suffices. Accordingly, the detect mechanism is simple, and the manufacture cost is low.

We claim:

1. In a disk playback device of the type comprising a magazine for housing a plurality of disks, a data playback section for playing back data recorded on a disk, a plurality of trays for supporting the disks, a tray turning mechanism for transporting a tray supporting a disk between the magazine and the data playback section, the improvement comprising:
   disk detecting means for detecting a presence of a disk on a tray, said disk detecting means being disposed adjacent to a leading end of the magazine so that said disk detecting means detects the presence of a disk on a tray when the tray turning mechanism transports the tray to a position which is outside of said magazine but not fully in the playback section.

2. The disk playback device as defined in claim 1, wherein said disk detecting means is an optical disk detecting means.

3. The disk playback device as defined in claim 1, wherein said disk detecting means is disposed outside of said magazine and adjacent to a first corner of the leading end of the magazine.

4. The disk playback device as defined in claim 3, wherein a tray is transported between the magazine and the playback section about an axis, the axis being disposed adjacent to a second corner of the leading end of the magazine which is opposite to the first corner of the leading end of the magazine.

5. In a disk playback device of the type comprising a magazine for housing a plurality of disks, each of the disks being supported on a respective tray, a playback section having a clamper, mounted on a distal end of a clamper arm, for clamping a disk, a pick-up for playing back data recorded on the clamped disk, and a tray turning mechanism for transporting a tray supporting a selected disk between the magazine and the playback section, the improvement comprising:
   guide means for moving said clamper only in a direction which is orthogonal to a surface of a selected disk which has been transported to the playback section so that a center of said clamper is coincident with a center of the selected disk and so that said clamper securely clamps the selected disk during playback.

6. The disk playback device as defined in claim 5, wherein said guide means comprises a pair of guide plates disposed on opposite sides of said clamper arm, a support member disposed between said guide plates, a pair of support plates extending from opposite ends of said support member, respectively, and at least one support bar coupled through said pair of guide plates, said pair of support plates, and through the distal end of said clamper arm.

7. The disk playback device as defined in claim 6, wherein said pair of guide plates each has guide slits which are orthogonal to the direction of a transported tray, and wherein said at least one guide bar is coupled through said respective guide slits of said guide plates.

8. In a disk playback device of the type comprising a magazine containing a plurality of disks, a magazine housing for receiving an inserted magazine and for housing the inserted magazine at a predetermined position therein, means for locking a magazine inserted to the predetermined position in the magazine housing, a playback section for playing back data recorded on a disk, a magazine detecting arm for moving to a first set position when the magazine is inserted to the predetermined position of the magazine housing, and a lock detecting arm for moving to a second set position when the magazine is locked in the magazine housing, the improvement comprising:
   a single detecting switch mounted on only one of said magazine detecting arm and said lock detecting arm, said detecting switch detecting that a magazine is inserted to the predetermined position of the magazine housing and that the inserted magazine is locked in the magazine housing by engaging with that one of said magazine and lock detecting arms which does not have mounted thereon said detecting switch.

9. The disk playback device as defined in claim 8, wherein said magazine detect arm has an L-shape, and is swingably coupled to an upper frame of the magazine housing.

10. The disk playback device as defined in claim 8, wherein said magazine detect arm includes an arc-shaped portion, a support portion which outwardly protrudes from a circumference of said arc-shaped portion, and wherein said detecting switch is mounted on said support portion.

11. The disk playback device as defined in claim 8, wherein the lock detecting arm is coupled to a side wall of the magazine housing, said lock detecting arm includes an extending portion which extends along a side wall of the magazine housing, and a stopper portion disposed at a distal end of said extending portion.

12. The disk playback device as defined in claim 11, wherein said magazine detect arm includes an arc-shaped portion, a support portion which outwardly protrudes from a circumference of said arc-shaped portion, said detecting switch is mounted on said support portion, said magazine detect arm and said lock detecting arm are movable to respective positions such that said stopper portion contacts said detecting switch mounted on said support portion, thereby indicating that the magazine is both contained and locked within the disk playback device.

13. In a disk playback device of the type comprising a magazine containing a plurality of disks, a magazine housing for housing the magazine, a playback section for playing back data recorded on a disk, and a disk transporting mechanism for transporting a selected disk between the magazine and the playback section, the playback section including a clamper, a support wheel and a disk guide for guiding a selected disk between the clamper and the support wheel, the improvement wherein said disk guide is disposed adjacent to, and outside of, said support wheel so that said disk guide guides different standard-sized disks.

14. The playback device as defined in claim 13, wherein said disk guide is disposed within a read-in area of the transported disk, the read-in area having no playback data recorded thereon.

15. The playback device as defined in claim 13, wherein said different standard-sized disks include an 8 cm diameter disk and a 12 cm diameter disk.

16. The playback device as defined in claim 13, wherein said disk guide has a horseshoe shape.

17. The playback device as defined in claim 15, wherein said disk guide includes a soft material on a surface thereof which contacts the selected disk.

18. In a disk playback device of the type comprising a magazine containing a plurality of disks, a plurality of trays for supporting the respective disks, each of the trays having a disk receiving depression for receiving and supporting an associated disk, a playback section for playing back data recorded on a disk, and a tray transport mechanism for transporting a tray supporting a selected disk as said disk moves between the magazine and the playback section, the playback section including a movable clamper and a spindle support wheel, said movable clamper moving to a clamping position to clamp a selected disk to the spindle support wheel during a disk playback operation, said movable clamper causing the selected disk to be separated from its associated tray during the playback operation, and said movable clamper moving to a rest position to disengage the disk from the spindle support wheel after the playback operation, the improvement comprising:

movable disk guide means movable to a first position and to a second disk contacting position, wherein when a tray is being transported between the magazine and the playback section, said movable disk guide means is moved to the first position which is located above the surface of the transported tray, and wherein after a disk playback operation and as said movable clamper moves from the clamper position to the rest position, said movable disk guide means moves to the second disk contacting position to cause the just played back disk to be securely placed back within the tray receiving depression of the tray.

19. The disk playback device as defined in claim 18, wherein said movable disk guide means is moved from said second disk contacting position to said first posion when said tray is returned to said magazine.

* * * * *